July 10, 1934. A. CHIERA 1,966,059
PRODUCTION OF WHITE LIGHT
Filed March 13, 1933  3 Sheets-Sheet 2
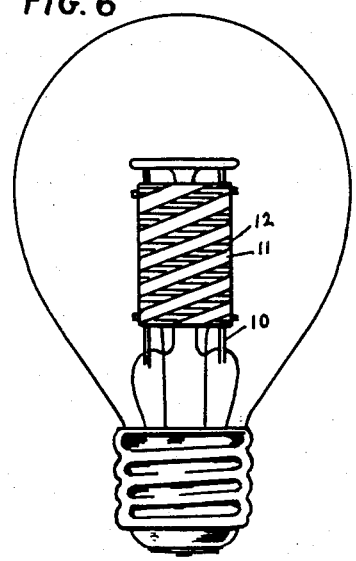
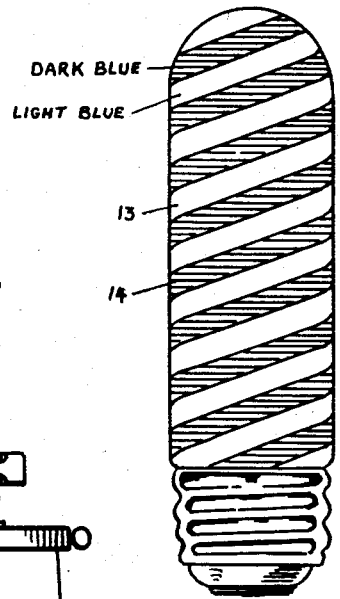
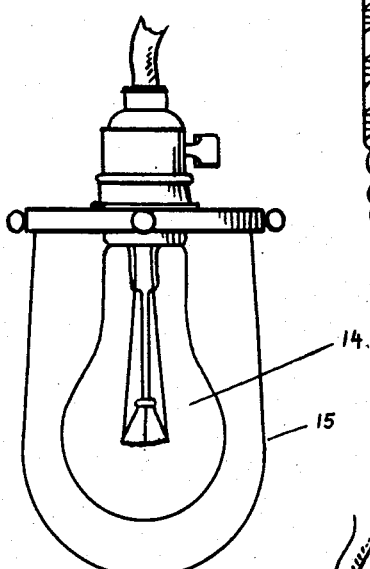
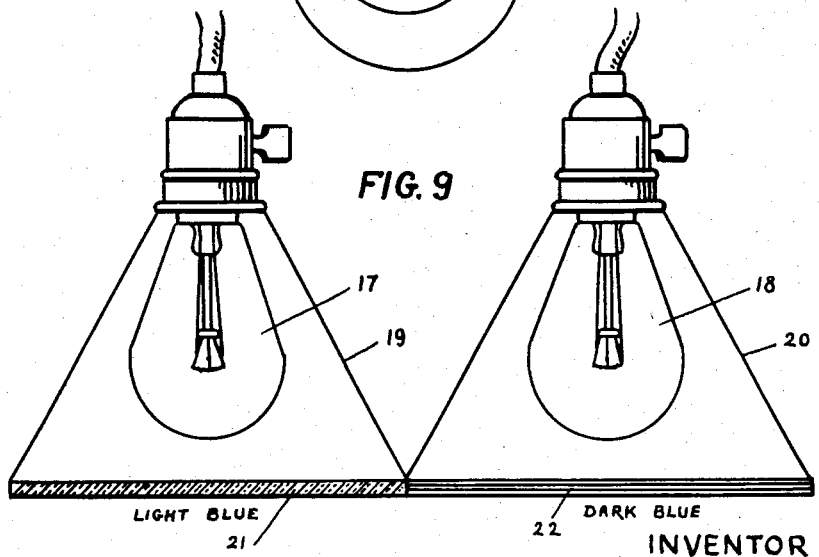

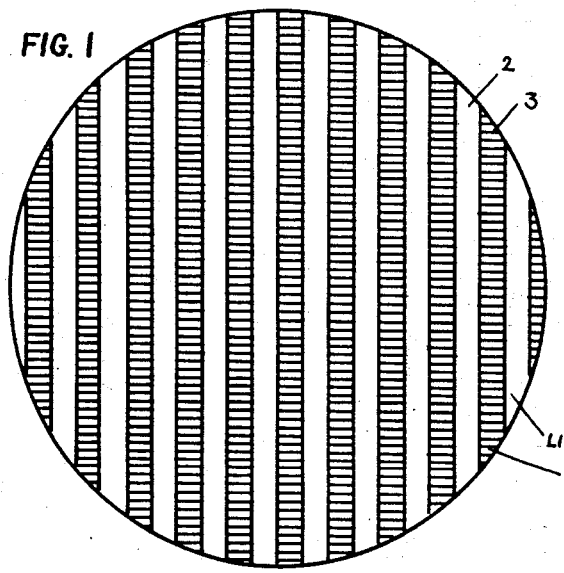
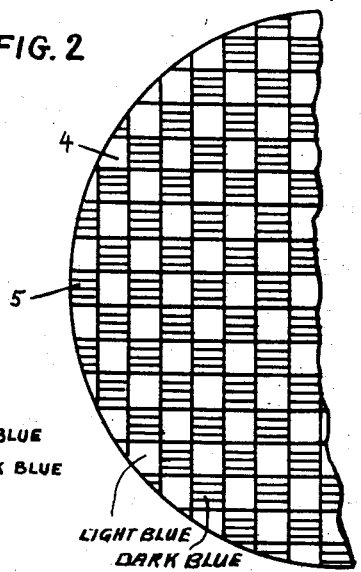
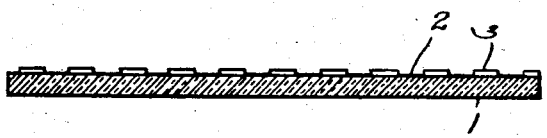
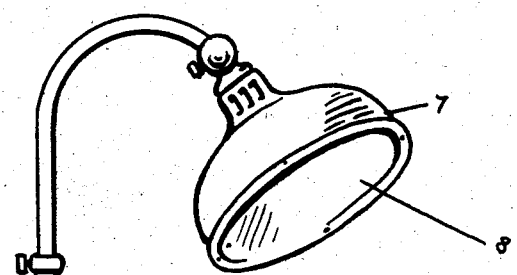

July 10, 1934. A. CHIERA 1,966,059
PRODUCTION OF WHITE LIGHT
Filed March 13, 1933 3 Sheets-Sheet 3
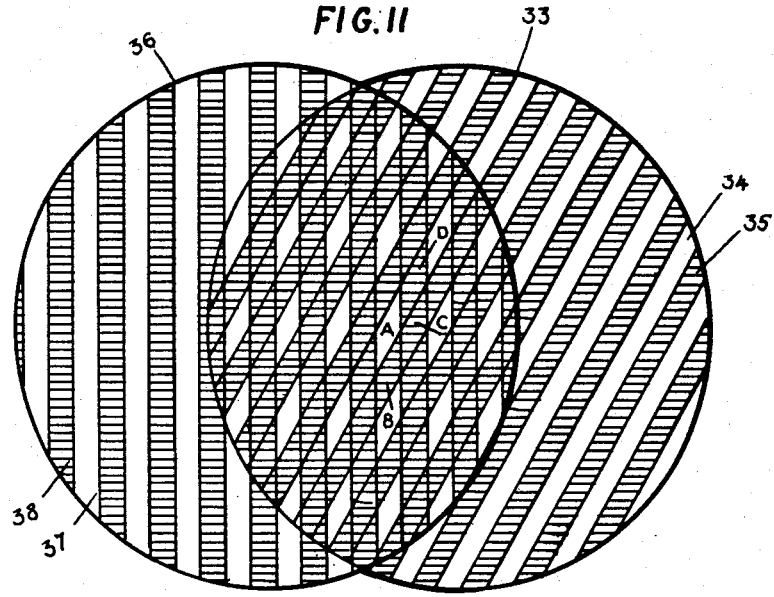
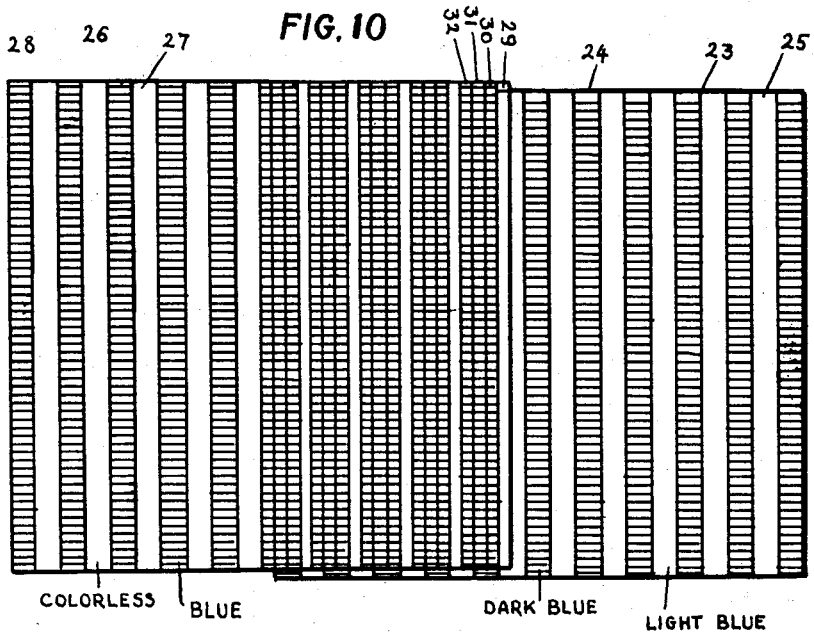
INVENTOR
Albert Chiera
ATTORNEYS
Hauff & Warland.

Patented July 10, 1934

1,966,059

UNITED STATES PATENT OFFICE 1,966,059

PRODUCTION OF WHITE LIGHT

Albert Chiera, Brooklyn, N. Y., assignor of five per cent to George Slaff and Milton G. Sass, New York, N. Y., under the firm name of Slaff & Sass, ten per cent to Morris Joffe, Brooklyn, N. Y., five per cent to Milton G. Sass, Samuel Slaff, and George Slaff, under the firm name of Slaff & Sass, New York, N. Y., and ten per cent to Ida Ginsburg, Mount Vernon, N. Y.

Application March 13, 1933, Serial No. 660,508

6 Claims. (Cl. 240—1.1)

My invention relates to the production of white light or, to put it more accurately, to the conversion of artificial light emanating from incandescent filaments or luminous arcs or from other sources to white light.

Ever since artificial lighting became of importance, it has been recognized that the light emanating from any source other than the sun has an undesirable color, varying from yellow to a deep orange. The harmful effect of such light upon the eyes of those employing it for reading has been attributed to the color. Moreover, the light changes the color of other objects, thereby making difficult, if not impossible, the task of those whose work requires accurate color determination. The recognition of this disadvantage in artificial light has led to a great deal of research work, the chief aim of which has been to correct this defect and convert the light emanating from artificial sources to as close an approximation of daylight as possible.

It is an object of my invention to convert the light emanating from an artificial source into a closer approximation of daylight or white light than has hitherto been obtainable, by causing this light to pass through a particular medium which constitutes the essence of my invention. I have found that, if light from an artificial source is caused to pass through a translucent medium having adjacent portions of light and dark blue, the transmitted light is usually almost entirely free from color, is nearly the same, in all its characteristics, as daylight and is decidedly different from the light produced by the conventional blue bulbs or blue screens in use at present.

I have further found that by using different shades of the same kind of blue together the result achieved is better than when different shades of different kinds of blue are employed. By "a kind of blue" I mean a definite blue color, such as cobalt blue, ultramarine blue, etc. I have found that the best results are obtained when the adjacent light and dark areas of the translucent medium are light and dark shades of ultramarine blue.

As pointed out above, the essential feature of my invention is that light from an artificial source is caused to pass through a translucent screen having adjacent portions of light and dark blue. The distance from the screen at which white light is produced will depend, of course, upon the size of the portions of the screen made from the respective shades of blue since upon the size of these portions will depend the point at which the rays emanating therefrom will focus. For this reason the adjacent portions of light and dark blue should be of comparatively small area. Generally speaking, I prefer to so proportion and design the adjacent light and dark blue portions of my screen that the rays transmitted therethrough will mix and form white light at a distance of about five inches from the screen.

I wish to emphasize that for the attainment of the desired result, in accordance with my invention, it is essential that the artificial light be caused to pass through a screen having adjacent light and dark blue zones. I may employ cobalt blue as the dark blue and sky blue or azure as the light blue. Shades of dark blue other than cobalt blue and shades of light blue other than sky blue can be used in conjunction so long as the fundamental rule that there must be adjacent portions of light and dark blue is observed. Preferably, I use adjacent portions of ultramarine blue, the one portion being about thrice the thickness of the other. This difference in thickness determines the difference in shade of the adjacent portions.

For best results, the light and dark blue areas should be distinctly defined; that is, there should be a sharp line of demarcation between the light blue and the dark blue as distinguished from a gradual deepening of the light blue to dark blue.

The relation between the light and dark blue portions and the respective shades of blue employed simultaneously is best illustrated by a reference to one method of manufacturing a screen for artificial light in accordance with my invention.

A plate of colorless glass is coated with a layer of rich ultramarine blue glass which may be fused on or cemented to the white glass. Stripes of wax are placed on the ultramarine glass and the surface thereof is then subjected to the etching action of hydrofluoric acid until the unwaxed stripes are etched away for about two-thirds of their thickness. After the removal of the wax, the resulting screen has alternate stripes of light and dark ultramarine blue of the proper shade relation to transform artificial light into an exact duplicate of white light.

It is to be understood that my invention is not restricted to any certain method of making the colored screen, to any shape of screen, or to any particular design of the light and dark blue portions. On the contrary, any method that will result in the formation of adjacent light and dark blue portions on a translucent medium may be employed, such as, painting, casting, embossing, brazing, etc. Likewise, my invention is not restricted to a translucent screen in the form of a plate, but is equally applicable to bulbs of any design and may be embodied in the form of a cylinder surrounding the incandescent filaments or carbon arc, as the case may be, and enclosed in a bulb or globe of conventional design. Furthermore, the light and dark blue portions may be in the form of stripes, either straight or having any desired curvature, polygons or areas of any other desirable configuration. Moreover, the light and dark blue portions may be entirely separate and distinct bodies arranged adjacent to each other.

For artificial light of the type commonly employed, at present, the combination of the two shades of ultramarine blue usually is effective for complete correction to daylight. As a general thing, for each different type of artificial light, some experimentation is advisable to determine the exact shade of light blue and the exact shade of dark blue which must be combined to give an exact reproduction of daylight. Moreover, since daylight itself is variable with location and environment, it may be desirable to experiment with different shades of blue to produce the exact type of daylight desired. In any event, the general rule upon which I have based my invention is not departed from, since, in all cases, a light blue is combined with a dark blue.

It is a further object of my invention to provide an adjustable screen that can be manipulated to reproduce from artificial light any desired type of daylight, it being well recognized that daylight itself is extremely variable. To this end I employ two screens which are to be used in superimposed relation. One of the screens has stripes of a given configuration, alternate stripes being a light shade of blue, preferably ultramarine blue, and the remaining stripes being a dark shade of the same blue, as described above. The other screen has stripes of the same configuration as those on the first, alternate stripes being colorless and the remaining stripes being a shade of the blue used in the first screen, either identical with the light shade used in said first screen or of a shade intermediate the light and dark blue shades used in the first screen.

In manipulating this combination of screens, I can superimpose them so that the blue stripes on the second screen coincide with the dark blue stripes on the first screen, in which case the colorless stripes on the second screen coincide with the light blue stripes on the first screen, whereby the difference in shade between the light and dark blue stripes is accentuated. Likewise by coinciding the colorless stripes of the second screen with the dark blue stripes of the first screen, I can diminish the difference in shade between adjacent stripes.

With the stripes of the two screens exactly coinciding, I can produce four successive stripes, each of a different shade of the same blue, by moving the screens relatively to each other in a direction perpendicular to the stripes. By rotating the screens relatively to each other I can produce polygonal areas, each of a different shade of blue, in groups of four.

By properly manipulating these screens, any desired variety of daylight can be reproduced from artificial light. It is impossible to give specific directions as to how to produce any given variety of daylight, since the manipulation of the screens necessary will depend entirely on the color of the artificial light which varies with the nature of the source of said light.

Further objects and advantages of my invention will appear from the following detailed description of the accompanying drawings, in which, Fig. 1 is a plan view of one type of screen embodying my invention.

Fig. 2 is a plan view of another type of screen in accordance with my invention.

Fig. 3 is a side elevation of Fig. 1.

Fig. 4 is a perspective view of a desk lamp embodying a screen such as shown in Figs. 1 and 2.

Fig. 5 is a section of a screen similar to Fig. 1 but differing therefrom in the method of manufacture and Figs. 6, 7, 8 and 9 are front elevations of other modifications of my invention.

Figs. 10 and 11 represent plan views of two modifications of a combination screen according to my invention showing how the blue zones can be varied by manipulation of the screens.

Referring to the drawings in detail, numeral 1 represents a plate of plain glass to which a plate of dark blue glass is secured in any desired manner, said blue glass having been etched to form light blue stripes 2 and dark blue stripes 3 in the manner described above. The dark blue stripes are exactly thrice the thickness of the light blue stripes.

In Fig. 2 the colored portions are in the form of squares, the light blue squares being designated by numeral 4 and the dark blue squares by numeral 5.

The lamp shown in Fig. 4 is a conventional reading lamp having a standard 6, a shade 7 enclosing a bulb, not shown, and a screen 8 colored in accordance with my invention.

The screen shown in Fig. 5 is made by casting a dark blue glass, for example, cobalt blue glass. The light blue portions 8 are about one-third the thickness of the dark blue portions 9, the difference in shade of the adjacent portions being due to this difference in thickness.

The bulb shown in Fig. 6 has metallic filaments 10, surrounded by a cylindrical translucent member having light blue stripes 11 and dark blue stripes 12, said stripes being arranged spirally about the cylinder.

In Fig. 7 is shown a bulb which is cylindrical in shape and which bears light blue stripes 13 and dark blue stripes 14.

In Fig. 8, 14 represents the usual incandescent bulb enclosed in a globe 15 which has adjacent stripes of light and dark blue of the configuration shown in Fig. 7 or of any other desirable configuration.

Fig. 9 illustrates an embodiment of my invention in which the light blue and dark blue surfaces are separate. 17 and 18 represent incandescent bulbs enclosed in conventional shades 19 and 20 respectively. Shade 19 carries a screen of light blue glass 21 and shade 20 carries a screen of dark blue glass 22. The rays of light, transmitted through screen 21 mix with the rays of light transmitted through screen 22, producing while light or daylight.

In Fig. 10 there is shown two rectangular screens partly in superimposed relation in a position to show the effect of relative movement of the plates in a direction perpendicular to the stripes from a position in which the stripes coincide. The lower screen 23 has stripes of dark blue 24 and stripes of light blue 25. The upper screen 26 has stripes 27 of blue of the same shade as the light blue stripes on screen 23 or a shade intermediate the shades of the light blue and dark blue stripes on screen 23 and colorless stripes 28. The upper screen is placed on the lower screen in a position in which about half of each of the stripes 27 on the upper screen overlaps half of each of the stripes 24 on the screen 23. In this position there are formed a series of four stripes 29, 30, 31 and 32. Stripe 29 is formed by the overlapping of part of the colorless stripe 28 of screen 26 with the light blue stripe of screen 23. Stripe 30 is formed by the overlapping of the colorless stripe of screen 26 on part of the dark blue stripe of screen 23. Stripe 31 is formed by the combination of the blue stripe of screen 26 with the dark blue stripe of screen 23. Stripe 32 is formed by the combination of the blue stripe of screen 26 with the light blue stripe of screen 23. Consequently, each of the four stripes is a different shade of blue. It is to be understood that these screens can be used, as pointed out before, with the blue stripes of screen 26 coinciding with the dark blue stripes or with the light blue stripes of screen 23. In the former case the difference in shade between the light and dark blue stripes is accentuated and in the latter case this difference in shade is diminished.

The screens shown in Fig. 11 are circular and are overlapped after relative rotation with respect to each other starting with the stripes of the respective screens in parallel position. The lower screen 33 has light blue stripes 34 and dark blue stripes 35. The upper screen 36 has colorless stripes 37 and blue stripes 38 of the same shade as the light blue stripes 34 or of a shade intermediate the shades of stripes 34 and 35. Normally these screens are used in superimposed relation with their circumferences coinciding. For the sake of clearness, however, they are shown off center. The rotation of these screens relative to each other results in the formation of polygons in groups of four, each of the polygons of each of the groups being of a different shade of blue from the remaining polygons of that group. For example, polygon $a$ is a combination of the colorless stripe of screen 36 with the light blue stripe of screen 33, polygon $b$ is a combination of the colorless stripe of screen 36 with the dark blue stripe of screen 33 and polygon $c$ is a combination of the blue stripe of screen 36 with the dark blue stripe of screen 33 and polygon $d$ is the combination of the blue stripe of screen 36 with the light blue stripe of screen 33.

It is apparent that the shape of the polygons will depend upon the degree of relative rotation of the screens and that these screens can be moved relatively to each other in a direction perpendicular to the stripes, starting with the stripes coinciding, in a manner similar to that shown in Fig. 10.

Having thus described the nature and objects of my invention and several embodiments of the same, which embodiments are to be taken as illustrative rather than limitative, what I claim as new and desire to secure by Letters Patent is:

1. A translucent medium for the conversion of artificial light into daylight comprising a pair of superimposed screens, one of said screens being entirely composed of a plurality of blue stripes, every other stripe being a light shade of blue and the remaining stripes being a dark shade of the same blue and the other screen being entirely composed of a plurality of stripes, every other stripe being colorless, and the remaining stripes being a lighter blue than the dark blue stripes of said first mentioned screen.

2. A translucent medium for the conversion of artificial light into daylight comprising a pair of superimposed screens one of said screens being entirely composed of a plurality of ultramarine blue stripes, every other stripe being light ultramarine blue and the remaining stripes being dark ultramarine blue, and the other screen being entirely composed of a plurality of stripes, every other stripe being colorless, and the remaining stripes being a lighter ultramarine blue than the dark ultramarine blue stripes of said first mentioned screen.

3. A filter for light from incandescent lights which comprises a translucent glass plate having one of its surfaces smooth and uninterrupted and having its other surface entirely composed of light and dark zones of the same kind of blue, each light zone being adjacent a dark zone.

4. A filter for light from incandescent lights which comprises a translucent light blue glass plate having superimposed on one of its surfaces spaced areas of a dark shade of the same kind of blue.

5. A filter for light from incandescent lights comprising a translucent glass plate having on one of its surfaces spaced areas of light blue glass of a given thickness and the remainder of the surface composed of blue glass of the same shade of the same kind of blue as the light blue areas, but of a thickness about three times that of the thickness of the light blue areas.

6. A filter for light from incandescent lights comprising a glass plate having on one of its surfaces alternate stripes of light blue glass of a given thickness and having the remaining stripes composed of the same kind of light blue glass of a thickness about three times that of the glass of the light blue stripes.

ALBERT CHIERA.